March 11, 1941.   M. RICHTER   2,234,278
TRICHROMATIC COLORIMETER
Filed Oct. 7, 1938
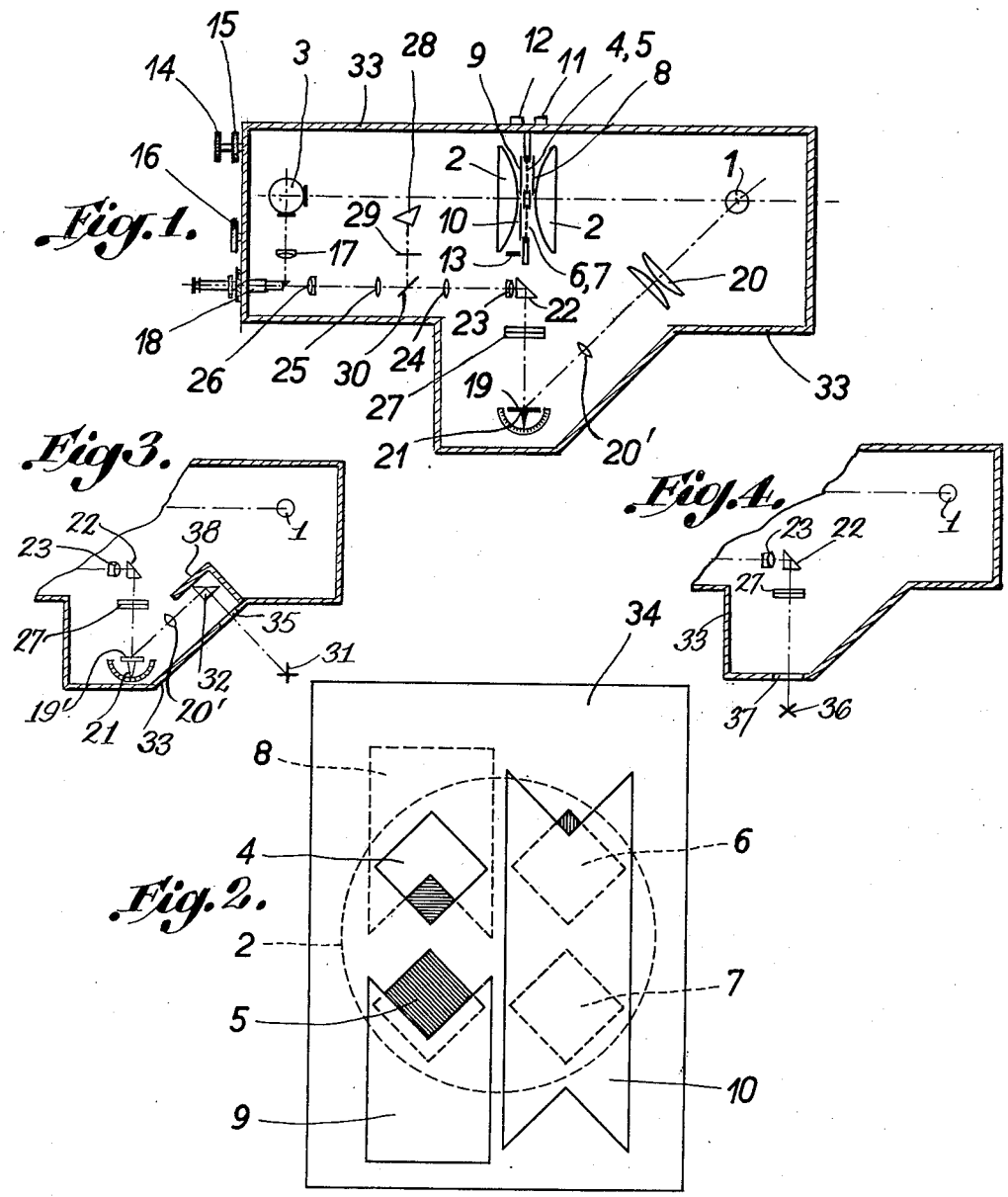
Inventor:
Manfred Richter Patented Mar. 11, 1941

2,234,278

UNITED STATES PATENT OFFICE 2,234,278

TRICHROMATIC COLORIMETER

Manfred Richter, Berlin, Germany, assignor to the firm of Carl Zeiss, Jena, Germany Application October 7, 1938, Serial No. 233,798
In Germany October 15, 1937

2 Claims. (Cl. 88—14)

It is known in the measurement of a color to imitate this color by means of an additive (optical) mixture and to derive from the three primary colors constituting the mixture the measuring figures of the color from those of these primary colors. Such measurements have been effected with so-called tri-chromatic colorimeters with three predetermined standard colors (in most cases red, green and blue).

In spite of its theoretical exactitude, this known color measuring method has the disadvantage that the mixtures cannot be uniformly made by different observers, which is due to individual differences of the color-senses of the observers from that of a so-called standard observer, so that the found measuring figures generally depart more or less from the measuring figures found by the ideal standard observer.

Considerably better results can be attained by providing that the difference between the spectral compositions of the light emanating from the test piece and the comparison light made to look like the light from the test piece is not too great. This is, however, arrived at by using for the mixture component parts which are of a color similar to the color to be measured. The consequence thereof is necessarily that, with a view to keeping as low as possible the number of the used colors, use is made of two colored, possibly saturated but non-spectral, lights the shades of which differ but slightly from each other and of a third color which is white or approximately white. Two of the colors are to be produced at option according to the color-shade of the test piece, as a consequence of which exchangeable color filters are to be used for these two colors.

The third color, white, can remain unchanged for all measurements, so that the filter producing the supplied white light (hereinafter called white filter) can be stationary.

To provide that the apparatus permits the measurement of any colors, this apparatus requires being provided with a device varying (eventually optically additively) the color of the light emanating from the test piece by admixture of a measurable quantity of at least one of the three standard colors. When choosing the colors according to the invention, it is advisable to use for this admixture only the white color. It is further advisable to provide means permitting the admixture of white in the one or the other ray path without the observer noticing this change and without incontinuities in the measurement.

In the case of colors of bodies it is necessary to so illuminate these bodies that strange light cannot exert any influence, so that measurements can be effected in daylight.

It is advantageous to make the light source used for the illumination of the filters available also for the illumination of the test-piece, because fluctuations in the luminous intensity of the light source will not in this case influence the results of the measurements.

In the accompanying drawing, which illustrates an apparatus according to the invention schematically, Figures 1 and 2 show an axial horizontal section through and a partial view of this apparatus, respectively.

Figure 3 shows in horizontal section a modification in part of the apparatus according to Fig. 1 when using the apparatus for the measurement of a colored light source, and Fig. 4 shows a modification in part of the apparatus when using it for measuring the color of a colored light source of small luminous density.

The light emitted by a light-source 1 traverses condensing lenses 2 and strikes a so-called Ulbricht sphere 3. Between the condensing lenses 2 are disposed square filters 4, 5, 6 and 7 arranged in such a manner that corresponding diagonals of the squares are parallel to each other (cf. Figure 2). 4 and 5 are exchangeable color filters, and 6 and 7 are stationary white filters (viz. filters which color the light emitted by the light source 1 white). All filters are placed on a plate 34 fixed to a housing 33. Slides 8, 9 and 10 disposed on the plate 34 and displaceable in one and the same direction parallel to a diagonal of each said filter are to change the cross-sectional area permitting the passage of light through the filters. The slides 8, 9 and 10 are coordinated to the color filter 4, the color filter 5 and the white filters 6, 7, respectively. The slide 8 lies before and the slides 9 and 10 lie in the rear of the plate 34. The slides have such right-angled recesses that the cross-sectional filter areas permitting the passage of light are square. The slide 10 is further so constructed that it covers in its medial position both white filters 6 and 7, and that even the slightest displacement from its medial position in the one sense or the other permits the passage of light through the cross-sectional area of the one or the other of these two filters 6 and 7, and that to displacements of the slide 10 from its medial position in the one sense or the other correspond the same cross sections of the two filters 6 and 7. The magnitude of the filter areas permitting the passage of light is indicated on scales 11, 12 and 13. The slides 8, 9 and 10 are operated by milled heads 14, 15 and 16, whose connection to the slides is, for convenience, omitted in the drawing. In the Ulbricht sphere 3, the light having traversed the color filters is subject to a complete additive mixture. The light leaving a lateral aperture in the sphere 3 is directed by means of an auxiliary lens 17 to the one half of the field of view of a device 18 for comparison of two colors, for instance a Martens photometer.

The other half of the field of view receives the light emanating from the test piece 19. This piece 19 is illuminated by the light source 1 and an illumination system 20, 20'. The test piece 19 is positioned in a holder 21 which can be rotated about a vertical axis and thus permits the observation of the gloss. A prism 22 and lenses 23, 24, 25 and 26 direct the light coming from the test piece 19 into the device 18. Between the test piece 19 and the prism 22 is disposed a liquid filter 27.

To admix white to the light emanating from the test piece 19, a prism 28 and an opal disc 29 are disposed in the rear of the white filter 6. The prism 28 is so constructed as to prevent the light rays leaving the filter 6 from entering the Ulbricht sphere 3. To provide that the white light striking the opal disc 29 can be seen at the same time as the light emanating from the test piece 19, a transparent glass plate 30 is disposed in the path of the rays emanating from the test piece 19. The drawing (Fig. 2) illustrates that position of the slide 10 in which light is transmitted by the filter 6. In this position of the slide 10 the other white filter 7 is covered, so that white light has no access to the Ulbricht sphere 3.

If instead of the color of a test piece the color of a colored light source 31 is to be measured, as illustrated in Fig. 3, a white standard plate 19' is to be substituted for the test piece 19.

Further, the light of the light source 1 is to be cut down against this white plate 19' by a screen 38, and to the illumination system 20' is to be coordinated a prism 32 which projects on the white standard plate 19' the colored light emanating from the light source 31 and entering the housing 33 through an aperture 35.

If the holder 21 and that part of the housing 33 which lies next thereto can be removed, a light source 36 of small luminous density can be coordinated to the corresponding aperture 37 in the housing for the measurement of its color.

I claim:

1. A trichromatic colorimeter, having a housing, said housing containing a device for comparing two colors, a holder for a test piece the color of which is to be measured, a device for the dispersing of light, an illumination device adapted to direct light in separate light paths to said test piece and said light dispersing device, means adapted to direct to said comparison device light emanating from the test piece and said light dispersing device, a device for changing the color of the light directed to said light dispersing device, said changing device comprising two colored and a white filter and three adjustable diaphragm slides, each of said diaphragm slides being coordinated to one of said three filters and adapted to change the free aperture of the respective filter, said two colored filters being exchangeable and said white filter being stationary in said housing, means for adjustment of said three diaphragm slides, indicating devices for indicating the positions of said three diaphragm slides, said white filter consisting of two equal parts displaced relatively to each other in the direction of displacement of the corresponding diaphragm slide, said corresponding slide being so constructed as to cover in its medial position both said white-filter parts and as to permit light to pass through part of the cross-sectional area of the one or the other white-filter part even when displaced very slightly from this medial position in the one sense or the other and that to equal displacements of the slide from its medial position in the one or the other sense correspond the same free cross-sectional areas of the two white-filter parts, and means coordinated to the one of said white-filter parts, said means being adapted to disperse the light having traversed said one part and to admix this light to the light emanating from the test piece.

2. A trichromatic colorimeter, having a housing, said housing containing a device for comparing two colors, a holder for a test piece the color of which is to be measured, a device for the dispersing of light, an illumination device adapted to direct light in separate light paths to said test piece and said light dispersing device, means adapted to direct to said comparison device light emanating from the test piece and said light dispersing device, a device for changing the color of the light directed to said light dispersing device, said changing device comprising two colored and a white filter and three adjustable diaphragm slides, each of said diaphragm slides being coordinated to one of said three filters and adapted to change the free aperture of the respective filter, said two colored filters being exchangeable and said white filter being stationary in said housing, means for adjustment of said three diaphragm slides, indicating devices for indicating the positions of said three diaphragm slides, said white filter consisting of two equal parts displaced relatively to each other in the direction of displacement of the corresponding diaphragm slide, said corresponding slide being so constructed as to cover in its medial position both said white-filter parts and as to permit light to pass through part of the cross-sectional area of the one or the other white-filter part even when displaced very slightly from this medial position in the one sense or the other and that to equal displacements of the slide from its medial position in the one or the other sense correspond the same free cross-sectional areas of the two white-filter parts, and means coordinated to the one of said white-filter parts, said means being adapted to disperse the light having traversed said one part and to admix this light to the light emanating from the test piece, the cross sectional area of each colored filter and each white-filter part being a square a diagonal of which lies in the direction of displacement of the corresponding diaphragm slide, and each diaphragm slide having a triangular recess so arranged that the filter cross sections through which the slide permits the passage of light are always square.

MANFRED RICHTER.